INVENTORS
P. F. WARNER
A. D. ADAMS
BY
Hudson & Young
ATTORNEYS

INVENTORS
P. F. WARNER
A. D. ADAMS
BY
*Hudson & Young*
ATTORNEYS

United States Patent Office 3,004,071
Patented Oct. 10, 1961

3,004,071
PROCESS OF OXIDIZING MERCAPTANS TO DISULFIDES
Paul F. Warner and Archie D. Adams, Phillips, Tex., assignors to Phillips Petroleum Company, a corporation of Delaware
Filed July 8, 1957, Ser. No. 670,447
9 Claims. (Cl. 260—608)

This invention relates to a method of controlling the oxidation of mercaptans. In another aspect, it relates to control apparatus sensitive to the conductivity of a stream to be analyzed.

In the process of oxidizing mercaptans with a cupric chloride catalyst to form disulfides, the cupric chloride is reduced to the cuprous state and is again returned to the cupric state by oxidation with air or other oxygen-containing gas. In practicing this process on a commercial scale, the reaction medium is a complex mixture, there being one phase containing the cupric chloride reagent together with a solvent, a second phase of disulfide, and a third phase consisting of the air or other oxygen-containing gas. Although all three separate phases are present in the reaction complex, there is so much agitation that the separate phases do not settle out, but are rather completely interspersed.

In this process, greatly increased efficiency of reagent utilization, i.e., amount of mercaptan converted per unit of time per unit of reagent, can be realized where the phase ratio of the disulfide phase to the reagent phase remains within rather sharply defined critical limits. This increased efficiency occurs where the volume percentage of the disulfide phase varies between a trace and 2 percent of the reagent phase or, again, where the volume percent of the disulfide phase is about 38 to 75 percent based on the total volume of disulfide and reagent phases. The lower limit is set by the phase ratio at which the disulfide becomes the continuous phase. For practical commercial operation, the amount of disulfide phase should not be greater than 60 percent due to dilution effects. Where these phase ratios are observed, feed rates three to four times higher than formerly possible have been attained.

It is manifest that such close control of the phase ratios requires rapid analytical techniques to properly control commercial operations. Heretofore, such control has been effected by withdrawing a sample of the material, allowing the phases to settle, and thus determining the volume phase ratio. Such a sampling procedure requires a considerable period of time, as the settling occurs only slowly.

We have found, unexpectedly, that the conductivity of the reaction medium is a direct function of the phase ratios of the disulfide and reagent phases. In particular, there is a substantially linear relationship between the logarithm of the resistance and the volume percent of the disulfide phase, even where the materials are thoroughly interspersed and mixed with air. As a result, the desired critical phase ratios can be maintained by varying the flow of make-up reagent phase to the system responsive to a substantially instantaneous conductivity measurement. Both manual and automatic control are readily feasible as a result of this conductivity determination.

We have further discovered that the conductivity-phase ratio relationship is somewhat dependent upon temperature and the rate of air flow through the system. In many commercial operations, the temperature and air flow remain substantially constant and thus need not be compensated for. However, where this is not true, we have provided a control system which compensates for the effects of these variables upon the conductivity-phase ratio relationship.

It is an object of the invention to provide a quick, practical method of determining the phase ratio between disulfide and reagent phases in a mercaptan oxidation reaction.

It is a further object to provide measuring and control apparatus which is reliable in operation and well adapted for automatic process control.

It is a still further object to provide a system for accurately maintaining phase ratios such that the most efficient utilization of the reagent is obtained.

Various other objects, advantages, and features of the invention will become apparent upon reading the following detailed description taken in conjunction with the accompanying drawing, in which.

Figure 1:
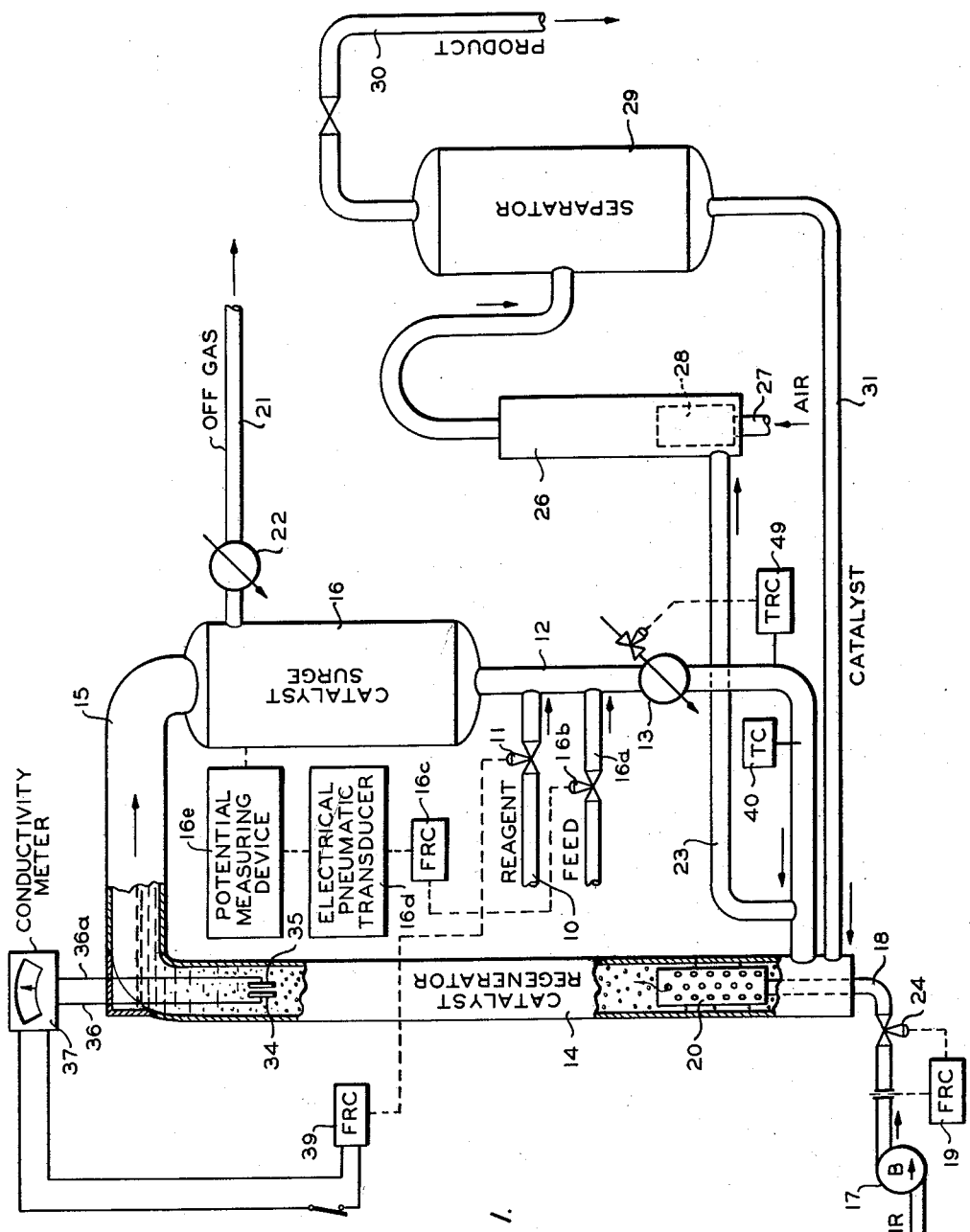
FIGURE 1 is a flow diagram of a mercaptan oxidation system constructed in accordance with the invention.

Referring now to the drawings in detail, and particularly to FIGURE 1, reagent is admitted to the system through a line 10 under the control of a motor valve 11. This line enters a circulating system which includes a vertical line 12, a cooler 13, a catalyst regeneration vessel 14, an overhead line 15, and a catalyst surge vessel 16. This circulating system is maintained substantially full of a cupric chloride reagent, the disulfide product, and air which are in the form of three separate but interspersed phases. The mercaptan feed is introduced through a line 16a under the control of a motor valve 16b. This valve, in turn, is actuated by a flow recorder-controller 16c which is reset by an electro-pneumatic transducer 16d actuated by a potential measuring device 16e of the type described in U.S. Patent 2,503,604.

Air is supplied to the bottom of the chamber 14 by a blower 17 which forces the air through a line 18 incorporating a flow recorder-controller 19 and a valve 24 to a perforated distributing member 20.

Off-gas is withdrawn from the catalyst surge chamber 16 by a line 21 incorporating a cooler 22.

A portion of the circulating stream is withdrawn through a line 23 into an air-contacting chamber 26. Air passes to the bottom of this chamber through a line 27 and a perforated distribution member 28. The stream is thus blown into a separating vessel 29 where two phases are separated. The upper phase, consisting of the disulfide product, is withdrawn through a valved conduit 30 while the denser reagent phase, consisting of cupric chloride in an organic solvent, is returned to the bottom of the regeneration chamber 14 by a line 31.

The mercaptan compounds which are suitable for oxidation by the process of the invention have the general formula RSH wherein R is an alkyl, aryl, aralkyl, or cycloaliphatic radical. Preferably, the aryl, aralkyl and cycloaliphatic radicals contain a maximum of 8 carbon atoms and the alkyl radicals contain a maximum of 12 carbon atoms. Specific examples of such mercaptans are tertiary butyl mercaptan, ethyl mercaptan, phenyl mercaptan, isopropylphenyl mercaptan, and cyclohexyl mercaptan.

The reagent is cupric chloride dissolved in a suitable organic solvent or medium. Suitable solvents are the monoalkyl glycol ethers wherein the alkyl group contains up to 8 carbon atoms and wherein said glycol is preferably ethylene glycol, diethylene glycol, propylene glycol or dipropylene glycol. However, the monoalkyl ethers of higher molecular weight glycols can be utilized with certain modifications, if desired. Specific examples are the monomethyl, monoethyl and monobutyl ethers of diethylene glycol, bis (β-ethoxyethyl) ether.

The gas utilized to convert the cuprous chloride to cupric chloride is normally air but other gases composed of a mixture of oxygen and inert gases can be used.

The temperature is not critical but is normally kept below 175° F. to avoid formation of insoluble copper compounds. A temperature of 150° F. is suitable. Reaction rates are low below about 100° F.

The reagent phase normally contains water within the range of 3 to 20 percent, the preferred range being 5 to 10 percent.

In accordance with the invention, a pair of electrodes 34, 35 are immersed in the circulating stream at any desired location. As shown, a suitable place is adjacent the top of the regenerator vessel 14. These electrodes are connected by leads 36, 36a to a conductivity meter 37 which produces an electrical output representative of the conductivity of the material between the electrodes. The output of the meter 37 is connected to a flow controller 39 controlling the motor valve 11.

Assuming that the desired volume percent of the disulfide phase is 48 percent, an increase in the disulfide ratio decreases the conductivity of the material between the electrodes 34, 35 even though said material is, as previously noted, in a turbulent and interspersed condition. The resulting signal from meter 37 actuates valve 11 to increase the amount of make-up reagent introduced through line 10, thus decreasing the disulfide to reagent ratio.

Conversely, a decrease in the volume percent of the disulfide phase below the desired value causes the conductivity of the material between the electrodes 34, 35 to increase, thus partially closing the valve 11 by the action of the flow controller 39. As a result, the ratio of disulfide phase to reagent phase is increased.

Consequently, a very rapid and efficient control of the proportion of disulfide phase is realized with resulting substantial economies in the efficiency of use of the treating reagent.

A similar action occurs where the unit of the invention is actuated to keep the disulfide phase volume percent within the range extending from a trace to about 1 percent. However, to operate in this manner, a phase separation must take place in the vessel 16, and the product is withdrawn from this vessel. Otherwise, the reagent returned to the system will contain too much disulfide phase to operate in the intended manner.

In one specific example, the feed was tertiary butyl mercaptan, the reagent was methyl carbitol (diethylene glycol monomethylether) containing cupric chloride, the oxidizing medium was air, the temperature was 150° F. and the volume percent of disulfide phase was 48 percent based on the total of disulfide and reagent phases.

As previously indicated, the temperature and air rate are normally maintained sufficiently steady in normal operation that no adjustment of the system is required to compensate therefor. However, where this is not true, the compensation circuit of FIGURE 2 can be employed. In this figure, the output of the meter 37 is fed through an amplifier 45 to a servo motor 46 which is connected to the contactor of a potentiometer 47 having a battery 48 connected across its fixed terminals.

A thermocouple 40 produces a voltage which is proportional to the temperature of the circulating stream, and this output is passed through an amplifier 50 to a servo motor 51 connected to the contactor of a potentiometer 52 which is in parallel with a battery 53.

The flow indicator 19 produces a pneumatic output representative of the air rate passing through line 18. It is connected to a transducer 54 which actuates the contactor of a potentiometer 55 connected in parallel with a battery 56.

The potentiometers 47, 52, and 55 are all connected in series with a transducer 58 which controls the rate of flow unit 39 as previously described. However, a temperature variation causes the contactor of potentiometer 52 to move a sufficient amount as to electrically balance out the change in conductivity produced by the temperature variation. Similarly, a change in the air rate causes an adjustment of the contactor of potentiometer 55 of the proper magnitude and direction as to compensate for the effect of this variable upon the conductivity. Thus, quick and effective control of the phase ratio is maintained despite variations in temperature and rate of flow of air to the system.

In a modification of the invention, electrodes 34a, 35a are disposed in the conduit 12, it being understood that parts similar to those described in connection with FIGURE 1 are denoted by like reference numerals. These electrodes are connected by the leads 36, 36a to the meter 37. An agitator 60 driven by a motor 61 is provided to mix the two phases before they contact the electrodes, the electrodes being mounted downstream of the line 23, and the line 31 joining the conduit 12 upstream of the electrodes instead of being connected directly to the regenerator vessel 14 as in FIGURE 1.

Figure 2:
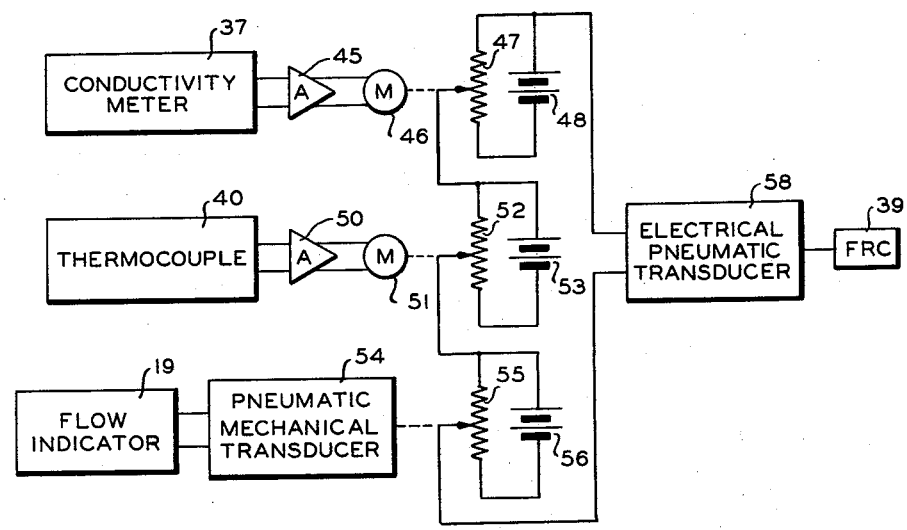
FIGURE 2 is a block diagram of a system for compensating for temperature variations and changes in air rate.
Figure 3:
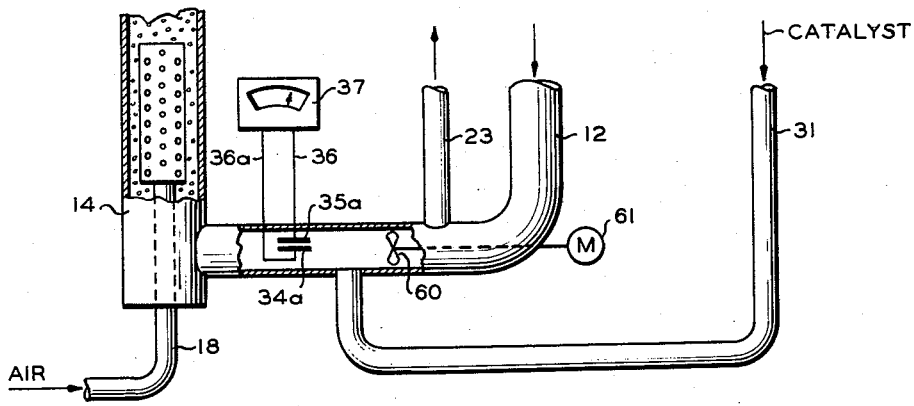
FIGURE 3 is a modification of the invention.

The operation is similar in all respects to that described in FIGURE 1. However, if the control system of FIGURE 2 is utilized, the flow indicator 19 and its related parts 54, 55 and 56 can be omitted because air is not present at the portion of the conduit where the measurement is taken. It will also be understood that a sample system can be provided wherein a stream is removed from the regeneration zone, passed either to a separating or agitating zone, and the electrodes then placed in this stream.

As many possible embodiments may be made of this invention without departing from the scope thereof, it is to be understood that all matter herein set forth, or shown in the accompanying drawings is to be interpreted as illustrative and not in a limiting sense.

We claim:

1. In a process for oxidizing mercaptans, the steps which comprise establishing a body of interspersed mercaptan feed, cupric chloride reagent, disulfide product and a free oxygen-containing gas, adding feed to the body, withdrawing product therefrom, continuously producing a signal representative of a variable which is a function of the ratio of the interspersed disulfide reagent phases, and adjusting the disulfide reagent phase ratio in response to said output signal.

2. In a process for oxidizing mercaptans, the steps which comprise establishing a body of mercaptan feed, cupric chloride reagent, disulfide product and air, continuously adding feed to the body and withdrawing product therefrom, measuring the conductivity of the interspersed circulating disulfide-reagent phases, and adjusting the disulfide-reagent phase ratio in response to said measured conductivity so that the volume percent of disulfide phase is between 38 and 75 percent based on the total volume of reagent and disulfide phases.

3. In a process for oxidizing mercaptans, the steps which comprise establishing a circulating stream of mercaptan feed, cupric chloride reagent, disulfide product and air, continuously adding feed to the circulating stream and withdrawing product therefrom, measuring the conductivity of the interspersed circulating disulfide-reagent phases, and adjusting the disulfide-reagent phase ratio in response to said measured conductivity so that the volume percent of disulfide phase is between 38 and 60 percent based on the total volume of reagent and disulfide phases.

4. The process for oxidizing mercaptans, the steps which comprise establishing a circulating stream of mercaptan feed, cupric chloride reagent, disulfide product and air, continuously adding feed to the circulating stream and withdrawing product therefrom, measuring the conductivity of the interspersed circulating disulfide-reagent phases, and adjusting the disulfide-reagent phase ratio in response to said measured conductivity so that the volume percent of disulfide phase is from a trace to 1 percent based on the total volume of reagent and disulfide phases.

5. In a process for oxidizing mercaptans, the steps which comprise establishing a circulating stream of mercaptan feed, cupric chloride reagent, disulfide product and air, continuously adding feed to the circulating stream, measuring conductivity of the interspersed circulating disulfide-reagent phases, all withdrawing product from said circulating stream in response to said measured conductivity so as to maintain said conductivity at a predetermined value.

6. In a process for oxidizing mercaptans, the steps which comprise establishing a circulating stream of mercaptan feed, cupric chloride reagent, disulfide product and air, continuously withdrawing product therefrom, measuring the conductivity of the interspersed circulating disulfide-reagent phases, and adding mercaptan feed to said circulating stream in response to said measured conductivity so as to maintain said conductivity at a predetermined value.

7. In a process for oxidizing mercaptans, the steps which comprise passing a current of air upwardly through an elongated regeneration zone containing cupric chloride reagent in a monoalkyl glycol ether solvent, and a disulfide product phase, flowing a stream of material withdrawn from the top of said regenerating zone to the bottom thereof, adding a quantity of mercaptan feed to the downwardly flowing stream, cooling the downwardly moving stream after the region of mercaptan introduction, withdrawing a quantity of the cooled downwardly flowing stream and introducing same to a quiescent zone wherein a disulfide phase separates from the reagent phase, withdrawing the disulfide phase as product, recycling the reagent phase, passing an electrical current through a portion of the circulating material, so as to produce an electrical output signal representative of the conductivity of said material, and adding additional cupric chloride reagent in quantities in accordance with said output so as to maintain the conductivity at a predetermined value.

8. In a process for oxidizing mercaptans, the steps which comprise passing a current of air upwardly through an elongated regeneration zone containing cupric chloride reagent in a monoalkyl glycol ether solvent, and a disulfide product phase, flowing a stream of material withdrawn from the top of said regeneration zone to the bottom thereof, adding mercaptan feed to the downwardly flowing stream, cooling the downwardly moving stream after the region of mercaptan introduction, withdrawing a portion of the cooled downwardly flowing stream and introducing same to a quiescent zone wherein a disulfide phase separates from the reagent phase, withdrawing the disulfide phase as product, recycling the reagent phase, passing an electrical current through a portion of the circulating material so as to produce an electrical output signal representative of the conductivity of said material, withdrawing said cooled downwardly flowing stream in response to said output signal so as to maintain the conductivity at a value representing a volume percent of disulfide phase of 38 to 60 percent, based on the total volume of reagent and disulfide phases.

9. In a process for oxidizing mercaptans, the steps which comprise establishing a circulating stream of mercaptan feed, cupric chloride reagent, disulfide product and air, continuously adding feed to the circulating stream and withdrawing product therefrom, measuring the electrical conductivity of the interspersed circulating disulfide-reagent phases, and adding cupric chloride reagent to said circulating stream in response to the measured conductivity signal so as to maintain said conductivity at a predetermined value.

References Cited in the file of this patent

UNITED STATES PATENTS

| | | |
|---|---|---|
| 1,951,035 | Parker | Mar. 13, 1934 |
| 2,421,545 | Crouch | June 8, 1947 |
| 2,517,934 | Schulze et al. | Aug. 8, 1950 |
| 2,592,063 | Persyn | Apr. 8, 1952 |
| 2,656,392 | Schulze et al. | Oct. 20, 1953 |
| 2,834,654 | Murayama | May 13, 1958 |
| 2,839,581 | Warner | June 17, 1958 |

UNITED STATES PATENT OFFICE
CERTIFICATION OF CORRECTION

Patent No. 3,004,071                          October 10, 1961

Paul F. Warner et al.

It is hereby certified that error appears in the above numbered patent requiring correction and that the said Letters Patent should read as corrected below.

Column 4, line 42, for "a", first occurrence, read -- an output --; column 5, line 8, for "all" read -- and --.

Signed and sealed this 10th day of April 1962.

(SEAL)
Attest:

ERNEST W. SWIDER                          DAVID L. LADD
Attesting Officer                           Commissioner of Patents